United States Patent
Leggett et al.

(10) Patent No.: US 8,897,928 B2
(45) Date of Patent: Nov. 25, 2014

(54) SYSTEMS FOR AND METHODS OF ENGINE DERATING

(71) Applicant: Omnitracs, LLC, San Diego, CA (US)

(72) Inventors: Kip A. Leggett, Chula Vista, CA (US); Felipe de Jesus Rivera, Cuautitlan Izcalli (MX)

(73) Assignee: Omnitracs, LLC, San Diego, CA (US)

( * ) Notice: Subject to any disclaimer, the term of this patent is extended or adjusted under 35 U.S.C. 154(b) by 15 days.

(21) Appl. No.: 13/628,881

(22) Filed: Sep. 27, 2012

(65) Prior Publication Data

US 2013/0085626 A1    Apr. 4, 2013

Related U.S. Application Data

(60) Provisional application No. 61/541,816, filed on Sep. 30, 2011.

(51) Int. Cl.
| | |
|---|---|
| *B60R 25/00* | (2013.01) |
| *B60R 25/04* | (2013.01) |
| *B60R 25/20* | (2013.01) |
| *B60R 25/045* | (2013.01) |

(52) U.S. Cl.
CPC .................................. *B60R 25/045* (2013.01)
USPC ............................................. 701/2; 701/102

(58) Field of Classification Search
CPC .. B60R 25/042; B60R 25/045; B60R 25/005; B60R 25/1001; B60R 25/04; B60R 25/257; F02D 11/107; F02D 41/263; F02D 41/1482; F01N 3/0814; F01N 3/0842; H04B 5/0037; H04B 5/0031; B60K 31/0058; B60K 31/16; F02N 11/0803; F02N 11/0866

USPC ............. 701/2, 107, 102; 180/279; 123/686; 60/285; 455/41.2; 340/5.64, 426.11
See application file for complete search history.

(56) References Cited

U.S. PATENT DOCUMENTS

| | | | | |
|---|---|---|---|---|
| 4,167,924 | A | * | 9/1979 | Carlson et al. ................. 123/686 |
| 5,835,868 | A | * | 11/1998 | McElroy et al. .................. 701/2 |
| 7,084,735 | B2 | | 8/2006 | Kapolka |
| 7,434,649 | B2 | | 10/2008 | Bolduc et al. |
| 7,598,846 | B2 | | 10/2009 | Griffin et al. |
| 7,957,882 | B2 | | 6/2011 | Morisset et al. |
| 2004/0041691 | A1 | * | 3/2004 | Kapolka ....................... 340/5.64 |
| 2005/0178602 | A1 | * | 8/2005 | Bolduc et al. ................. 180/279 |
| 2005/0184858 | A1 | * | 8/2005 | Griffin et al. ............. 340/426.11 |
| 2006/0053772 | A1 | * | 3/2006 | Dou et al. ........................ 60/285 |
| 2008/0255742 | A1 | | 10/2008 | Morisset et al. |
| 2011/0196595 | A1 | * | 8/2011 | Cook ............................ 701/107 |

(Continued)

OTHER PUBLICATIONS

Anonymous: "Vehicle Immobilization Technologies (VITs)", Sep. 6, 2008 (Sep. 9, 2008), XP055046939, pp. 2. Retrieved from the Internet: URL:http://www.ornl.gov/sci/ees/etsd/cta/Vehicle%20Immobilization%20Technologies.pdf [Retrieved on Dec. 6, 2012} the whole document.

(Continued)

*Primary Examiner* — Tuan C. To
*Assistant Examiner* — Yuri Kan
(74) *Attorney, Agent, or Firm* — Arent Fox LLP

(57) ABSTRACT

Systems for, and methods of, derating and locking down a vehicle's engine are described. The systems and methods gradually derate an engine in response to a command sent over the air in a manner that does not cause the engine control module (ECM) of the vehicle to generate an error code.

19 Claims, 3 Drawing Sheets

(56) References Cited

U.S. PATENT DOCUMENTS

2011/0288743 A1* 11/2011 Smith .......................... 701/102
2013/0045683 A1* 2/2013 Wang et al. ................. 455/41.2

OTHER PUBLICATIONS

International Search Report and Written Opinion—PCT/US2012/058071—ISA/EPO—Dec. 14, 2012.

* cited by examiner

SYSTEMS FOR AND METHODS OF ENGINE DERATING

RELATED APPLICATIONS

This application claims the benefit of priority to U.S. Provisional Patent Application No. 61/541,816 entitled "SYSTEMS FOR AND METHODS OF ENGINE DERATING" filed Sep. 30, 2011. The entire is hereby incorporated herein by reference.

BACKGROUND

The present disclosure addresses, primarily, the problem of vehicle or cargo theft. Specifically, potentially dangerous or damaging conditions are created once a vehicle is stolen, such as potential harm to third parties and damage to the vehicle.

Vehicles, such as diesel tractor trailers, include engine control modules (ECM), which are responsible for controlling electronic signals to the engine. In such vehicles, a throttle position sensor (TPS) is used to monitor the position of the throttle of the vehicle's internal combustion engine. A sensor signal from the TPS is output to the vehicle's ECM, which alters ignition and fuel injection timing depending upon, among other things, a position of the vehicle's throttle. In particular, the TPS may be a potentiometer that provides a variable voltage to the ECM depending on the position of the accelerator pedal.

SUMMARY

Systems for, and methods of, remote engine derating and lockdown are disclosed. An exemplary implementation includes a method of controlling a vehicle. The method includes receiving an indication of an active operation of the vehicle, receiving a command, at the vehicle, to derate an engine of the vehicle, and identifying a variable voltage provided by a throttle position sensor (TPS) of the vehicle. The method further includes detecting when the variable voltage reaches a threshold beyond the normal idle voltage of the vehicle, generating a voltage ramp in response to the variable voltage reaching the threshold, where the voltage ramp has a negative slope, and providing the voltage ramp to an engine control module (ECM) of the vehicle.

BRIEF DESCRIPTION OF THE DRAWINGS

The accompanying drawings, which are incorporated in and constitute a part of this specification, illustrate implementations of the present disclosure and together with the description, serve to explain the implementations.

DETAILED DESCRIPTION

Implementations are directed towards systems for, and methods of, engine derating and lockdown. Engine derating causes a gradual stop of the vehicle via a deceleration of the engine. Thus, instead of immediately locking down the vehicle, which can cause harmful situations, gradual deceleration of the vehicle provides for a safer disabling of the vehicle's movement. Further, the module derates the vehicle, without the engine control module (ECM) of the vehicle generating a failure code.

The derate function blocks the normally variable voltage from the TPS so that the vehicle can no longer be accelerated. In particular, a microprocessor monitors the variable voltage of the TPS. This voltage travels from the TPS through the normally closed input of a switch, and is delivered to the ECM. When the variable voltage reaches a pre-defined voltage threshold, the switch toggles to the normally open position, and the microprocessor activates a ramp generator, which generates a negative voltage ramp, which is in turn interpreted by the ECM as a deceleration of the vehicle. Thus, the ECM receives the negative voltage ramp instead of the voltage from the TPS, and does not generate a failure code.

Reference will now be made in detail to exemplary implementations of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration-specific exemplary implementations. These implementations are described in sufficient detail to enable those skilled in the art to practice the implementations, and it is to be understood that other implementations can be used and that changes can be made without departing from the scope of this disclosure. The following description is, therefore, merely exemplary.

Figure 1:
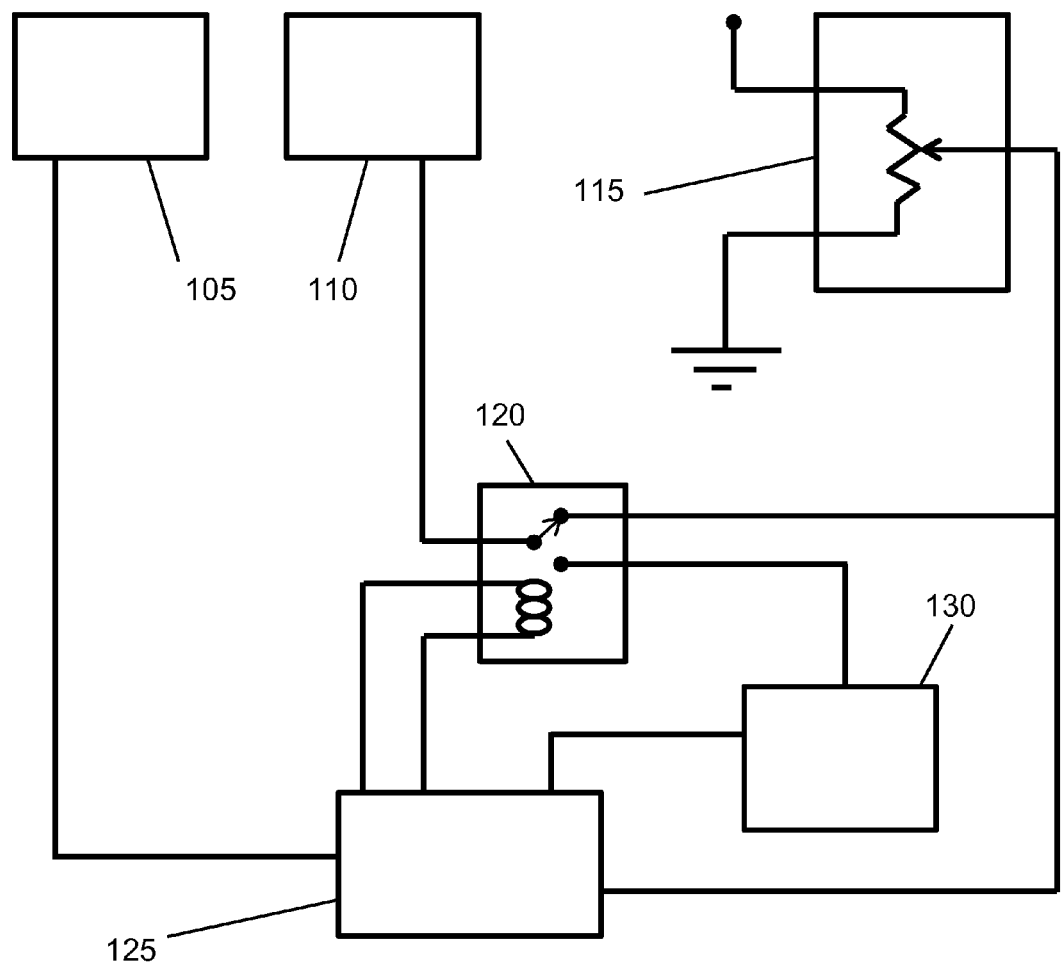
FIG. 1 depicts a system according to various implementations.

FIG. 1 depicts a system according to various implementations. The vehicle typically includes as standard features ECM 110, TPS 115 and switch 120. Switch 120 includes a normally open contact, a normally closed contact, an armature and a coil, which, when activated, transitions the armature from the normally closed contact to the normally open contact. ECM 110 is communicatively coupled to the armature of switch 120. TPS 115 monitors the position of the throttle and sends a signal to ECM to control engine ignition and timing.

Though TPS 115 is depicted as a potentiometer in FIG. 1, other types of TPS are within the scope of the present disclosure. For example, TPS 115 may be a double potentiometer, a Hall effect TPS, or a closed throttle position sensor. TPS 115 is coupled to ground and a voltage source, typically +5v DC. The wiper arm of TPS 115 is operatively coupled to the throttle of the vehicle. The electronic connection of the wiper arm of TPS 115 is communicatively coupled to the normally closed contacts of switch 120. Thus, the wiper arm of TPS 115 is normally electronically connected to ECM 110 and provides a voltage corresponding to throttle position thereto. The wiper arm of TPS 115 is also communicatively coupled to microprocessor 125.

The normally open contact of switch 120 is communicatively coupled to ramp generator 130. Ramp generator 130 is also communicatively coupled to microprocessor 125. Microprocessor 125 is communicatively coupled to the coil of switch 125 such that microprocessor may activate switch 120.

Ramp generator 130 is configured to provide a decreasing voltage ramp, that is, a linearly-changing voltage potential with a negative slope. In some implementations, ramp generator provides a voltage that decreases from a first predetermined voltage to a second predetermined voltage in a time interval of, by way of non-limiting example, 1 second, 2 seconds, 5 seconds, 10 seconds, 20 seconds, 30 seconds or 1 minute.

Microprocessor 125 may be, by way of non-limiting example, a PIC16F886-I/SP, available from Microchip Technology Inc. of Chandler, Ariz.

The system further includes communication module 105 communicatively coupled to microprocessor 125. Communications module 105 is capable of communicating over the air with a network management center via one or more networks. The network can utilize a satellite dish operating with one or more satellites, a cellular network, or another type of network (e.g. GSM, CDMA, TDMA, WCDMA, EDGE, OFDM, GPRS, EV-DO, WiFi, Bluetooth, WiMAX, UWB, or PAN). Communication module 105 may use a modem or other communication device to communicate with satellites or one or more cellular base stations configured to facilitate data communication between communications module 105 and the network management center. An exemplary communications module is a GNX-10, available from GenX Mobile Incorporated of San Jose, Calif.

The network management center may include an interface that can send and receive data to and from communications module 105. That is, the network management center can be configured to send and receive data from communications module 105 via base stations, a satellite dish, satellites, or any combination thereof. The network management center may also include at least one workstation configured to allow a human user to interact with communications module 105. The workstation may be a computer that includes a keyboard and display, as well as a graphical user interface to facilitate communications with communications module 105. The network management center may be housed in a facility remote from the location of the vehicle that includes an implementation of the system of FIG. 1.

Any, or a combination, of switch 120, microprocessor 125, communications module and ramp controller 130 may be coupled to ECM 110 and to each-other using the Society of Automotive Engineers J1939 or J1708 standards, including the physical layers associated with such standards.

Although switch 120, microprocessor 125 and ramp generator 130 are depicted as separate components in FIG. 1, two or more of these elements may be combined into a single module. In some implementations, ramp generator 130 is implemented in microprocessor 125.

It should be appreciated to a person having ordinary skill in the art that features shown in FIG. 1 are not exhaustive, and that other features are envisioned.

Figure 2:
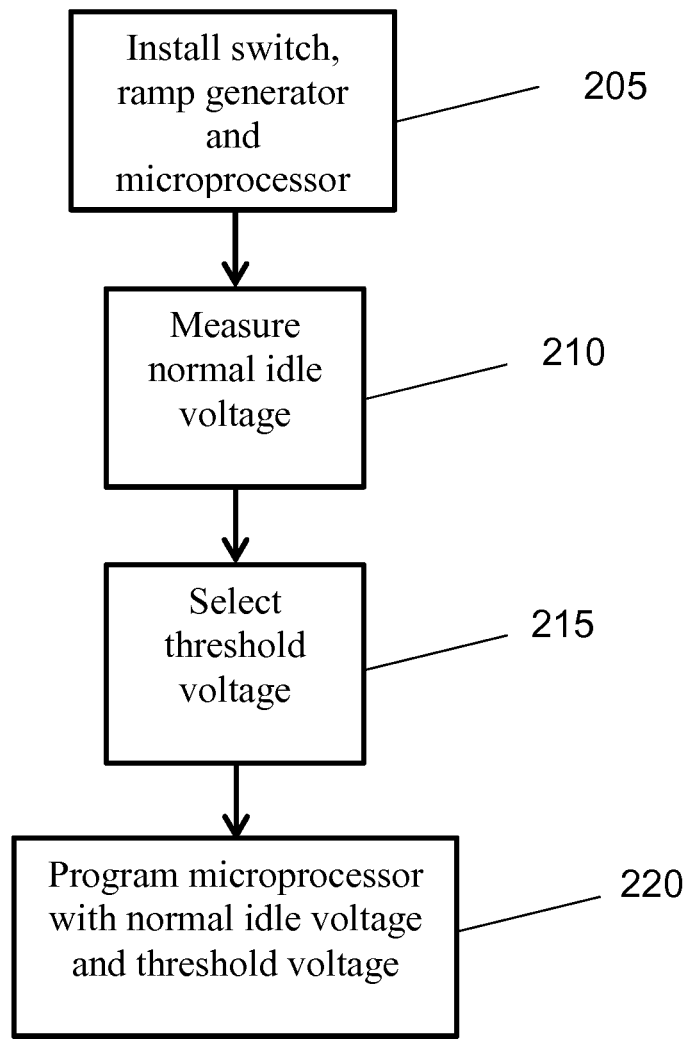
FIG. 2 depicts an installation flowchart according to various implementations.

FIG. 2 depicts an installation flowchart according to various implementations. Typically, one or more technicians may perform the steps depicted in FIG. 2. The vehicle typically already includes as standard features an ECM and TPS. Accordingly, at block 205, the technician installs a switch (e.g., switch 120 of FIG. 1), microprocessor (e.g., microprocessor 125 of FIG. 1) and ramp generator (e.g., ramp generator 130 of FIG. 1). The technician may also install a communications module (e.g., communications module 105 of FIG. 1), or that component may already be present in the vehicle.

At block 210, the technician measures the normal idle voltage provided by the vehicle's TPS. This may be performed using a standard voltmeter. Note that normal idle voltages may vary among different vehicle makes and models. Indeed, normal idle voltages may vary among different vehicles of the same make and model. Accordingly, the technician measures the normal idle voltage of the particular vehicle in which an implementation is installed so that the implementation may be appropriately calibrated.

At block 215, the technician selects a threshold voltage. As discussed in detail in reference to FIG. 3, the threshold voltage serves to trigger the vehicle derate function of certain implementations discussed herein. Exemplary values for the threshold voltage selected at block 215 include 0.1v, 0.2v, 0.3v, 0.4v and 0.5v. The selection of the threshold voltage depends in part on the value of the normal idle voltage measured at block 210. For example greater normal idle voltage values may generally be associated with greater threshold voltages.

At block 220, the technician programs the microprocessor with the normal idle voltage determined at block 210 and the threshold voltage selected at block 215. More particularly, the technician interfaces with the microprocessor using standard programming tools and techniques, which may include a workstation or laptop computer. The technician may program the microprocessor by burning instructions or values into the microcontroller's firmware. The voltage values programmed at block 220 may be stored as binary values in such firmware.

It should be appreciated to a person having ordinary skill in the art that features shown in FIG. 2 are not exhaustive, and that other features are envisioned.

Figure 3:
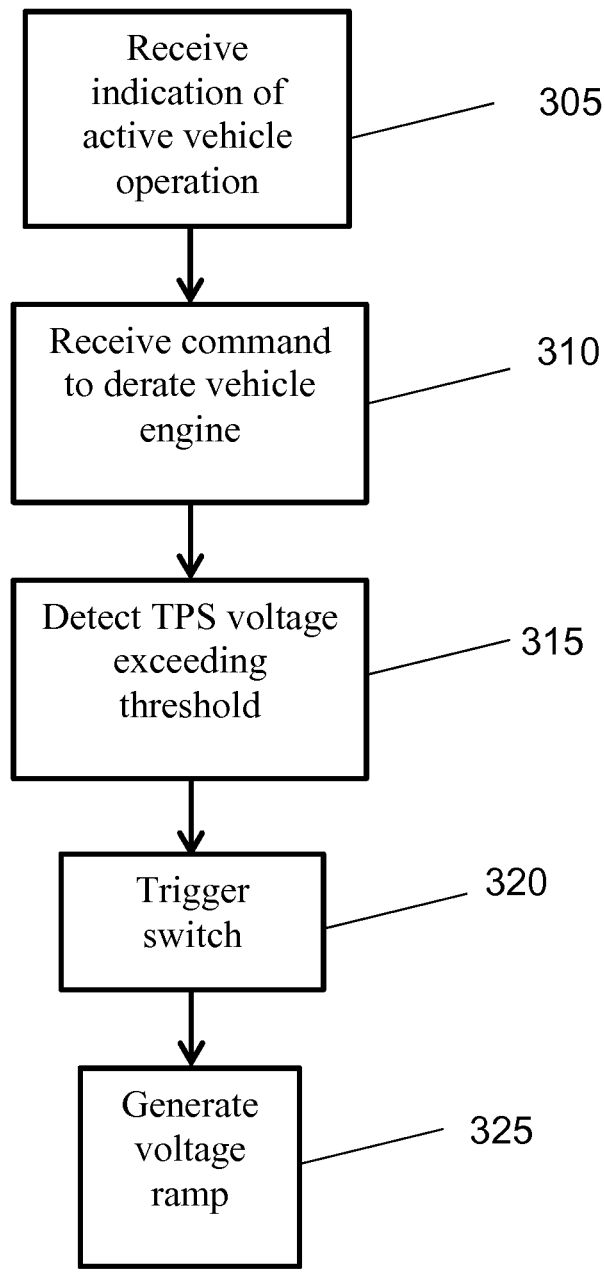
FIG. 3 depicts an operation flowchart according to various implementations.

FIG. 3 depicts an operation flowchart according to various implementations. The operation depicted in reference to FIG. 3 may be performed using, by way of non-limiting example, the system discussed above in reference to FIG. 1. At block 305, the process receives an indication of active vehicle operation. Here, "active" means that the engine is running. The indication may be received by, for example, communications module 105, ECM 110 or the network management center, as those features are discussed above in reference to FIG. 1. At block 310, a command to derate the vehicle's engine is received. Here, "derate" means that the engine is transitioned to a state of idle. The command may be sent by, for example, the network management center discussed above in reference to FIG. 1. The command may be received by, for example, communications module 105 of FIG. 1. The command may be transmitted using, for example, a TCP/IP protocol.

At block 315, the voltage potential provided by the vehicle's TPS is detected as exceeding a threshold. The threshold may be that as discussed above in reference to FIG. 2. The threshold may be exceeded by, for example, a vehicle's operator activating the vehicle's accelerator pedal. Depressing the vehicle's accelerator pedal, in turn, causes the TPS to increase a delivered voltage. In the system discussed above in reference to FIG. 1, the voltage is received by microprocessor 125, which detects that the delivered voltage exceeds the predefined threshold.

At block 320, in response to the detected voltage exceeding a threshold, a switch (e.g., switch 120 of FIG. 1) is triggered. In reference to switch 120 of FIG. 1, this encompasses microprocessor 125 sending a current to the coil of switch 120, which transitions the switch's armature from the normally closed contact to the normally open contact. This transition causes ECM 110 to be disconnected from the signal from TPS 115 and instead connected to the output of ramp generator 130.

At block 325, in response to the detected voltage exceeding a threshold, a ramp generator (e.g., ramp generator 130 of FIG. 1) generates a voltage ramp with a negative linear slope. As discussed above in reference to FIG. 2, the voltage ramp may be over a period of 1 second, 2 seconds, 5 seconds, 10 seconds, 20 seconds, 30 seconds, or one minute. The voltage ramp may begin at a voltage that is the sum of a predetermined threshold plus a normal idle voltage, and end at the normal idle voltage. Thus, the voltage function may be, by way of non-limiting example:

$$v(t) = t\left(\frac{-T}{I}\right) + N + T.$$

In the above equation, v(t) is the voltage produced by the ramp generator at time t, N is the normal idle voltage for the vehicle, T is the voltage threshold, and I is the interval of time over which the ramp decreases from the sum of the normal idle voltage and the threshold T to the normal idle voltage N. Note that in the above equation, v(0)=N+T and v(I)=N.

The ramp generator's output affects the ECM of the vehicle, causes the vehicle's engine to achieve an idle state. This causes the vehicle to retain its power steering and brakes, without being able to significantly move.

Another feature of certain implementations is the ability to lock down a vehicle's engine. This is achieved by receiving a lockdown command at, for example, communications module 110 of FIG. 1. The lockdown command may be sent from the network management center discussed above in reference to FIG. 1. The command is processed by, e.g., microprocessor 125 of FIG. 1. An assessment is made (e.g., by microprocessor 125 of FIG. 1) as to whether the vehicle is active, where "active" means that the engine is running. If the assessment is that the vehicle is inactive, the TPS is disengaged from the ECM (e.g., by switch 120 of FIG. 1). This disengagement may be affected by, for example, microprocessor 125 activating the coil of switch 120. Consequently, attempts to start the vehicle will prove fruitless, as the ECM will not receive any signal from the TPS.

It should be appreciated to a person having ordinary skill in the art that features shown in FIG. 3 are not exhaustive, and that other features are envisioned.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processing of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected. Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of controlling a vehicle, the method comprising:
   receiving an indication of an active operation of the vehicle;
   receiving a command, at the vehicle, to derate an engine of the vehicle;
   identifying a variable voltage provided by a throttle position sensor (TPS);
   detecting when the variable voltage reaches a threshold above a normal idle voltage for the vehicle;
   generating a voltage ramp to decrease voltage provided to an engine control module (ECM) of the vehicle over a plurality of intervals of time in response to the variable voltage reaching the threshold and based at least in part on receiving the command to derate the engine of the vehicle, wherein the voltage ramp has a negative slope; and
   providing decreasing voltage to the ECM of the vehicle according to the voltage ramp.

2. The method of claim 1, further comprising, prior to the receiving the indication:
   measuring a voltage generated by the TPS when the vehicle is at idle; and
   programming a microprocessor with a value for the measured voltage and a value for the threshold.

3. The method of claim 1, wherein the threshold is between 0.1 volt and 0.5 volts.

4. The method of claim 1, wherein the variable voltage is delivered to the ECM via a switch in a normally closed position.

5. The method of claim 1, further comprising toggling a switch from a normally closed position to an open position based at least in part on detecting when the variable voltage reaches the threshold, wherein toggling the switch causes the ECM to be disconnected from the TPS and connected to a ramp generator that generates the voltage ramp for providing the decreasing voltage to the ECM.

6. The method of claim 1, wherein the command is sent over the air using a protocol selected from the group consisting of: GSM, CDMA, TDMA, WCDMA, EDGE, OFDM, GPRS, EV-DO, WiFi, Bluetooth, WiMAX, UWB, PAN.

7. The method of claim 1, wherein the voltage ramp begins at the voltage generated by the TPS when the vehicle is at idle plus the threshold, and wherein the voltage ramp ends at the voltage provided by the TPS when the vehicle is at idle.

8. The method of claim 1, wherein a duration of the voltage the ramp is between one second and one minute.

9. The method of claim 1, wherein the ECM does not generate an error in response to the controlling the vehicle.

10. The method of claim 1, further comprising receiving a command, at the vehicle, to lock down the engine of the vehicle.

11. The method of claim 10, further comprising disabling the engine of the vehicle disconnecting the TPS from the ECM, in response to the receiving a command and receiving an indication of an inactive operation of the vehicle.

12. A system for controlling a vehicle, the system comprising:
- a ramp generator configured to provide a voltage ramp, wherein the voltage ramp has a negative slope;
- a switch comprising a normally open contact, a normally closed contact, an armature, and an activation coil, wherein the armature is communicatively coupled to an electronic control module (ECM), the normally open contact is communicatively coupled to the ramp generator, and the normally closed contact is communicatively coupled to a throttle position sensor (TPS); and
- a microprocessor communicatively coupled to the ramp generator, to the activation coil, and to an interface configured to receive a command, over the air, to derate an engine of the vehicle, wherein the microprocessor is configured to activate the activation coil to transition the armature from the normally closed contact to the normally open contact to and activate the ramp generator in response to receiving a command to derate the engine and detecting a normal idle voltage plus a threshold voltage from the TPS.

13. The system of claim 12, wherein the microprocessor is programmed to store a value of a voltage generated by the TPS when the vehicle is at idle and a value for the threshold voltage.

14. The system of claim 12, wherein the threshold voltage is between 0.1 volt and 0.5 volts.

15. The system of claim 12, wherein the command is sent over the air using a protocol selected from the group consisting of: GSM, CDMA, TDMA, WCDMA, EDGE, OFDM, GPRS, EV-DO, WiFi, Bluetooth, WiMAX, UWB, PAN.

16. The system of claim 12, wherein the ramp generator is configured to provide a voltage ramp to derate the engine of the vehicle, wherein the voltage ramp that begins at a voltage provided by the TPS when the vehicle is at idle plus the threshold, and wherein the voltage ramp ends at the voltage provided by the TPS when the vehicle is at idle.

17. The system of claim 12, wherein the ramp generator is configured to provide a voltage ramp with a duration of between five seconds and two minutes.

18. The system of claim 12, wherein the interface is further configured to receive a command, over the air, to lock down an engine of the vehicle.

19. The system of claim 18, wherein the microprocessor is further configured to cause the ramp generator to withhold a signal in response to the command to lock down the engine of the vehicle in response to receiving the command to lock down the engine of the vehicle and receiving an indication of an inactive operation of the vehicle.

\* \* \* \* \*